UNITED STATES PATENT OFFICE.

ARCHIE P. EVES, OF AKRON, OHIO.

PROCESS OF DEVULCANIZING RUBBER.

No. 801,066.  Specification of Letters Patent.  Patented Oct. 3, 1905.

Application filed April 6, 1905. Serial No. 254,209.

*To all whom it may concern:*

Be it known that I, ARCHIE P. EVES, a citizen of the United States, residing at Akron, in the county of Summit and State of Ohio, have invented new and useful Improvements in Processes of Devulcanizing Rubber, of which the following is a specification.

My invention relates to methods for the devulcanization of rubber; and the object thereof is to produce a method which will effectually remove from vulcanized rubber the vulcanizing agent incorporated therein. Heretofore various processes, including those wherein powerful acids and alkalies are used, have been tried; but in none of the processes mentioned has there been complete success in the removal of this agent. In considering a method for the devulcanization of rubber it must be remembered that the process of vulcanization consists, essentially, in the addition of sulfur to crude rubber, aided by the use of pressure, disintegration, and heat, chemically, sulfur being known by the symbol "S" and the crude-rubber hydrocarbon by the sign $(C_{10}H_{16})n$. The cured rubber may be represented by the symbol $(C_{10}H_{16})nS$. Now to devulcanize this vulcanized hydrocarbon it is necessary to desulfurize the hydrocarbon sulfid. This has been partially accomplished in a number of ways; but the result of any process commercially in use to-day is only partially a success, for analysis of any form of devulcanized rubber now on the market will show a large percentage of sulfur, and in many cases this is greater in the devulcanized article than in the original cured rubber in its initial form, thereby demonstrating the fact that devulcanization has not taken place, but, on the other hand, a greater and more intense degree of vulcanization has been accomplished. Cured or vulcanized india-rubber at ordinary temperature is insoluble; but it has been found that at a temperature of from 300° to 400° Fahrenheit in the presence of water it reaches such a condition that it will readily give up sulfur when a reducing or devulcanizing agent has been admitted thereto. A knowledge of this fact led to the employment of caustic soda (NaOH) as such agent; but this powerful agent, it was found, had destructive action upon the rubber hydrocarbon itself, tending to harden its tissues and injuring its elasticity and resiliency. It has been determined, however, that many of the neutral salts, and preferably the neutral salt of sodium, (sodium sulfate,) under certain conditions has an equivalent desulfurizing effect upon vulcanized rubber as the sodium hydroxid, yet its action is not sufficiently violent to attack the rubber hydrocarbon itself. This neutral sodium sulfate decomposes at a certain temperature, and vulcanized india-rubber in the presence of decomposed sulfate of sodium gives up its sulfur, and sodium hydrosulfate is formed, and if a salt of a different form, as barium chlorid, be added to this solution all the sulfur free in the solution and combined with the rubber can be removed as the insoluble barium sulfate. Therefore owing to the destructive effects of strong acids and alkalies upon the vulcanized rubber waste, which has been used for devulcanization purposes, as referred to before, I use instead the salts of the metals for the reclaiming or devulcanizing of said rubber to the end that the resulting product being neutral can be used for the various purposes for which fresh or crude rubber is used.

In carrying out my improved method I take finely-ground rubber waste and place this in a suitable containing vessel together with a solution, preferably of sodium sulfate, great care being taken to have enough of the solution in the vessel to thoroughly permeate or impregnate the rubber and completely submerge it. The vessel is then sealed to prevent evaporation of the solution during the process, and the contents of the vessel are heated to 320° Fahrenheit, and this temperature is maintained for a period of approximately five hours. Then the vessel is opened and a strong solution of barium chlorid is added, the vessel closed as before, and the contents heated to a temperature of 340° Fahrenheit for a period of nine hours. The amount of barium chlorid used is governed by the amount of sulfur found in the solution of sodium sulfate, and the solution of barium chlorid must be of sufficient strength to not only take up the free sulfur of the solution, but also to act on any sulfur which may still be retained by the rubber. The result obtained is practically a complete desulfurization of the rubber and the elimination of any fabric which may have been incorporated in or with the rubber waste. The product of the method is perfectly neutral, being absolutely free from acid or alkaline reaction, and is then thoroughly washed to remove chemicals, and the devulcanized rubber thus produced has substantially the characteristics of fresh rubber and capable of being used in like manner and for like purposes.

What I claim, and desire to secure by Letters Patent, is—

A method of devulcanizing rubber, consisting in subjecting the material to be treated to sodium sulfate or its equivalent in the presence of heat, and then incorporating in the mass, barium chlorid or its equivalent.

In testimony whereof I have hereunto set my hand in presence of two subscribing witnesses.

ARCHIE P. EVES.

Witnesses:
 C. E. HUMPHREY,
 G. H. STADELMAN.